(12) United States Patent
Nam

(10) Patent No.: US 8,255,969 B2
(45) Date of Patent: Aug. 28, 2012

(54) UPGRADING SOFTWARE OF SET-TOP BOX

(75) Inventor: Moon-Hyun Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1960 days.

(21) Appl. No.: 11/337,541

(22) Filed: Jan. 24, 2006

(65) Prior Publication Data

US 2006/0190977 A1 Aug. 24, 2006

(30) Foreign Application Priority Data

Feb. 18, 2005 (KR) .................. 10-2005-0013740

(51) Int. Cl.
*H04N 7/173* (2006.01)
*H04N 7/16* (2006.01)

(52) U.S. Cl. ......... 725/152; 725/100; 725/132; 725/140

(58) Field of Classification Search ........... 725/151–152
See application file for complete search history.

(56) References Cited

U.S. PATENT DOCUMENTS

| 6,826,185 | B1 * | 11/2004 | Montanaro et al. | 375/E7.022 |
|---|---|---|---|---|
| 7,051,325 | B2 * | 5/2006 | Choi et al. | 725/152 |
| 7,075,899 | B2 * | 7/2006 | Sheehan et al. | 375/340 |
| 2006/0085827 | A1 * | 4/2006 | Ozawa | 725/135 |
| 2006/0174306 | A1 * | 8/2006 | Kim et al. | 725/152 |
| 2006/0209668 | A1 * | 9/2006 | Lerner et al. | 370/206 |

FOREIGN PATENT DOCUMENTS

| JP | 2002-094407 | | 3/2002 |
|---|---|---|---|
| JP | 2002-142164 | | 5/2002 |
| JP | 2002-198922 | | 7/2002 |
| JP | 2002-238003 | | 8/2002 |
| JP | 2002-290869 | | 10/2002 |
| JP | 2004-349923 | | 9/2004 |
| KR | 2000-0045549 | | 7/2000 |
| KR | 1019990046623 | * | 5/2001 |
| KR | 2002-0015431 | | 2/2002 |
| KR | 1020000048529 | * | 2/2002 |
| KR | 10-2004-0066611 | | 7/2004 |
| KR | 1020030003732 | * | 7/2004 |
| WO | 00/03541 | | 1/2000 |
| WO | WO 2004114663 A1 | * | 12/2004 |

OTHER PUBLICATIONS

Office Action issued by Japanese Patent Office dated Jan. 13, 2009 in the corresponding Japanese Patent Application No. 2006-038811.
Office Action from the Chinese Patent Office issued in Applicant's corresponding Chinese Patent Application No. 200610082098.5 dated Apr. 4, 2008.
Transmitter letter and the Decision of Rejection issued on Jun. 23, 2009 in the corresponding Japanese Patent application No. 2006-038811.
Korean Office Action for Korean Patent Application No. 10-2005-0013740 issued on Sep. 21, 2006.

* cited by examiner

*Primary Examiner* — Pankaj Kumar
*Assistant Examiner* — Randy Flynn
(74) *Attorney, Agent, or Firm* — H.C. Park & Associates, PLC

(57) ABSTRACT

In an apparatus and method to upgrade software of a set-top box, when a malfunction renders it impossible to receive software upgrade data through System Information (SI), the data is received through Program Specific Information (PSI). Accordingly, it is not only possible to upgrade the software when a malfunction occurs, but also to recover from the malfunction.

11 Claims, 5 Drawing Sheets

FIG. 3
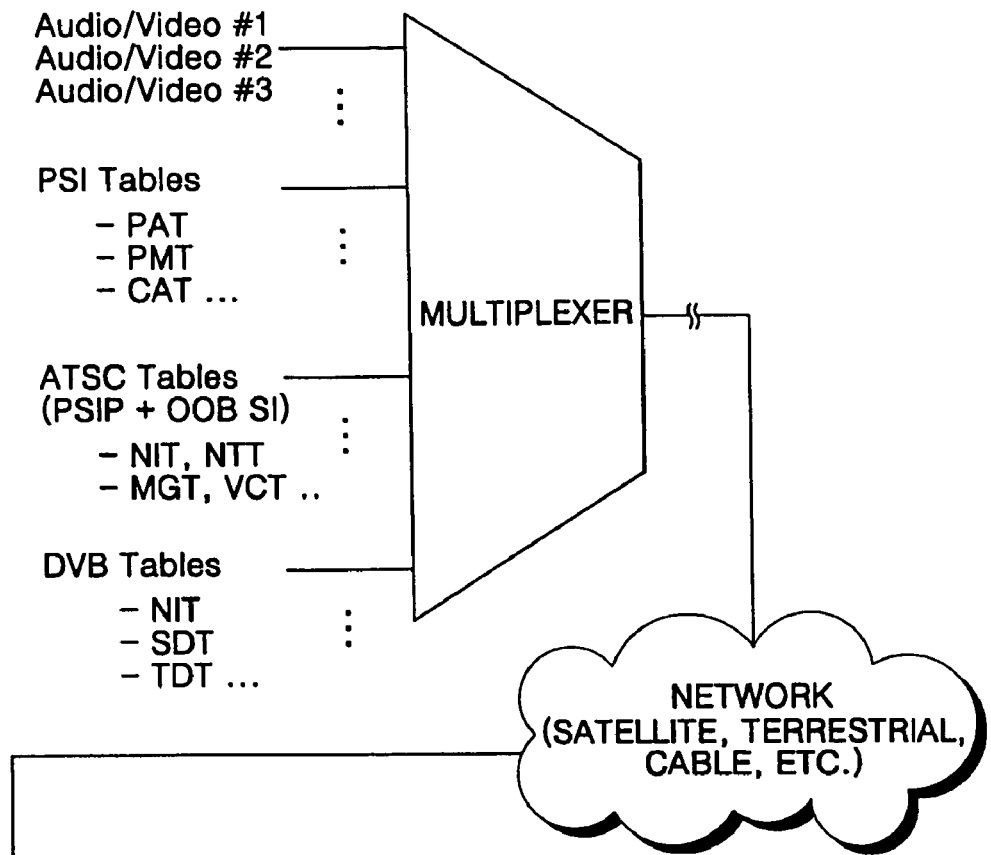
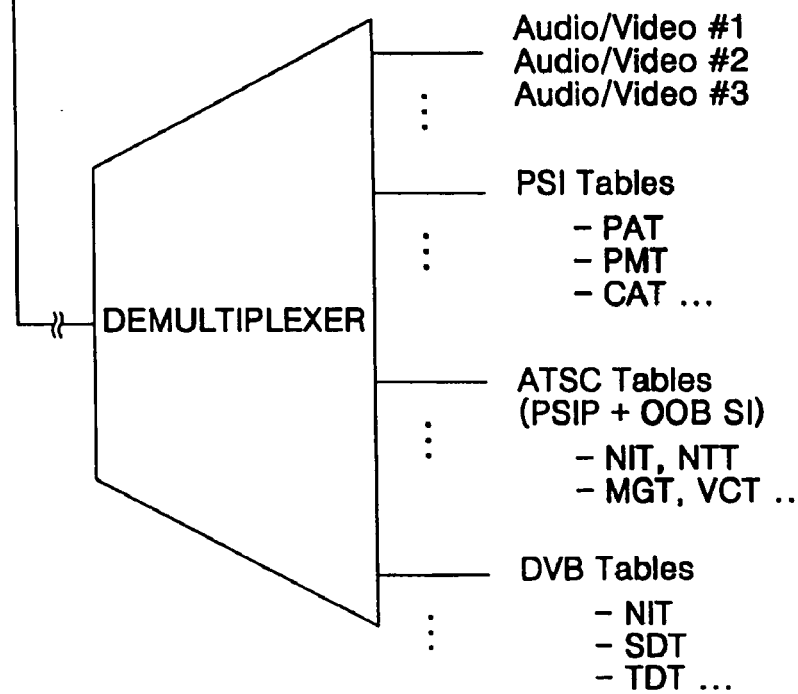

UPGRADING SOFTWARE OF SET-TOP BOX

CLAIM OF PRIORITY

This application makes reference to, incorporates the same herein, and claims all benefits accruing under 35 U.S.C. §119 from an application for APPARATUS AND METHOD FOR UPGRADING SOFTWARE OF SET-TOP BOX earlier filed in the Korean Intellectual Property Office on Feb. 18, 2005 and there duly assigned Serial No. 10-2005-0013740.

BACKGROUND OF THE INVENTION

1. Field of the Invention

The present invention relates generally to upgrading software of a Set-Top Box (STB), and more particularly, to an apparatus and method for upgrading software when a malfunction occurs in an STB.

2. Description of the Related Art

Remote software upgrade is a technique that enables a system's software to be upgraded without directly accessing the system. This technique is fast and easy and therefore quite useful. Due to its convenience, remote software upgrade is being applied to systems in which large quantities of data are transmitted from a remote location. One such system is a digital broadcasting system, in which remote software upgrade is supported over a broadcasting network.

A digital broadcasting system includes a digital broadcasting transmission station, at least one head end connected to the digital broadcasting transmission station through a network, and a Set-Top Box (STB) connected to the head end. The digital broadcasting system can utilize various types of networks, such as a satellite broadcasting network, a terrestrial broadcasting network, a cable broadcasting network, and so on.

The STB can receive software upgrade data when software is damaged and fails to operate properly, or when software is upgraded from an older version, in order to improve broadcasting services. The STB receives the software upgrade data from the digital broadcasting transmission station. The digital broadcasting transmission station can transmit the software upgrade data together with a broadcasting signal through the network in order to upgrade the software of the set-top box. The head end makes it possible to transmit the broadcasting signal between the STB and the digital broadcasting transmission station by generating information on the system. Depending on the type of system, the head end can be omitted.

In general, the STB upgrades its software through System Information (SI). Specifically, the STB receives and analyzes SI to detect a location of downloadable software, tunes into the frequency of the location, and then finds software upgrade data to upgrade its software.

An STB first determines whether or not its software requires upgrading. If it is determined that upgrading is required, the STB determines whether or not there is software-related SI in a received signal. If the result of checking indicates that there is no software-related SI, the STB performs a step of attempting to receive new SI, and a step of determining whether the newly received SI is associated with a software upgrade, until software-related SI has been received.

If there is software-related SI in the received signal, the STB receives data for upgrading its software using the corresponding SI, and upgrades its software using the received data.

Normally, the software upgrading scheme of the STB that makes use of the above-described SI has the advantage of being able to rapidly retrieve the corresponding software.

However, in the case of damaged or malfunctioning software, the STB is often unable to fully perform a software upgrade. Damaged or malfunctioning software can be a result, for example, of a power supply malfunction during software upgrading, or accidental removal of a power plug by a user while saving software. In such a case, because power is cut off before completion of the upgrade or saving operation, an error is generated in an integrity test. In order to repair the error, a new attempt must be made to upgrade the software.

When normal service can no longer be provided due to software damage, the STB attempts to forcibly analyze the SI, to detect the location of usable software, and to upgrade the detected software after frequency tuning. However, when something is wrong with a head end or a transfer channel for a control message, etc., it is impossible to receive normal SI. Thus, software cannot be downloaded until the problem is solved.

The problem is that according to the software upgrading scheme using SI, software can be received only when SI is received from the head end. Of course, there are digital broadcasting systems where no head end is used, like Out-Of-Band (OOB) systems. In such systems, the SI is transmitted alone through a separately defined channel, and if something is wrong with the corresponding channel, the STB cannot obtain the SI for upgrading the software. Furthermore, since SI downloading modes defined in different standards are all different, a problem of compatibility between the STB and the SI of the corresponding mode arises.

SUMMARY OF THE INVENTION

It is, therefore, an object of the present invention to provide an apparatus and method of upgrading software, capable of upgrading software of a malfunctioning Set-Top Box (STB).

It is another object of the present invention to provide an apparatus and method of upgrading software, capable of performing recovery of the malfunctioning Set-Top Box (STB).

It is yet another object of the present invention to provide an apparatus and method of upgrading software, capable of being applied universally to Set-Top Boxes (STBs) having different standards.

According to one aspect of the present invention, an apparatus to upgrade software of a Set-Top Box (STB) is provided, the apparatus including: a receiver adapted to receive a digital broadcasting signal and to extract Program Specific Information (PSI) from the received digital broadcasting signal; and a controller adapted to receive the PSI from the receiver and to receive software upgrade data using the received PSI to upgrade the software.

The controller is preferably adapted to detect a location of the software upgrade data using the PSI and to receive the software upgrade data from the detected location. The controller is preferably adapted to detect the location of the software upgrade data using program_number, stream_type, and transport_stream_id information included in the PSI.

The receiver preferably includes: a tuner adapted to scan for a frequency of the digital broadcasting signal to receive the signal; and a demultiplexer adapted to receive a multiplexed signal from a channel of the frequency scanned by the tuner, to demultiplex the received signal, and to split the demultiplexed signal into original signals.

The controller is preferably adapted to control the tuner to scan for a channel of another frequency upon the PSI received through the demultiplexer not being the PSI containing the software upgrade data. The controller is preferably adapted to receive the software upgrade data using System Information (SI) when the software needs to be upgraded, and to receive the software upgrade data through the PSI upon the software upgrade data not being received normally using the SI. The controller is preferably adapted to determine whether or not the software upgrade data has been received normally through the SI by performing a Cyclic Redundancy Check (CRC).

According to another aspect of the present invention, a method of upgrading software of a Set-Top Box (STB) is provided, the method including: detecting, by the set-top box, whether or not a request to upgrade the software has been made; extracting Program Specific Information (PSI) from received information; receiving software upgrade data using the PSI; and upgrading the software using the received software upgrade data.

The set-top box detecting the request to upgrade the software preferably determines whether or not the software upgrade data is receivable through System Information (SI), and receives the software upgrade data through the PSI only upon a determination that the software upgrade data is not receivable through the SI.

The determination of whether or not the software upgrade data is receivable through the SI preferably includes performing a Cyclic Redundancy Check (CRC).

Receiving the software upgrade data preferably includes: checking for a location of the software upgrade data using the PSI and receiving the software upgrade data from the location of the software upgrade data.

Checking for the location of the software upgrade data is preferably effected using program_number, stream_type and transport_stream_id information contained in the PSI.

Detecting that a request to upgrade the software has been made preferably includes detecting that an error has been generated as a result of performing a Cyclic Redundancy Check (CRC).

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein:

FIG. 3 are views of signals transmitted between a digital broadcasting station and an STB in a digital broadcasting system;

DETAILED DESCRIPTION OF THE INVENTION

Figure 1:
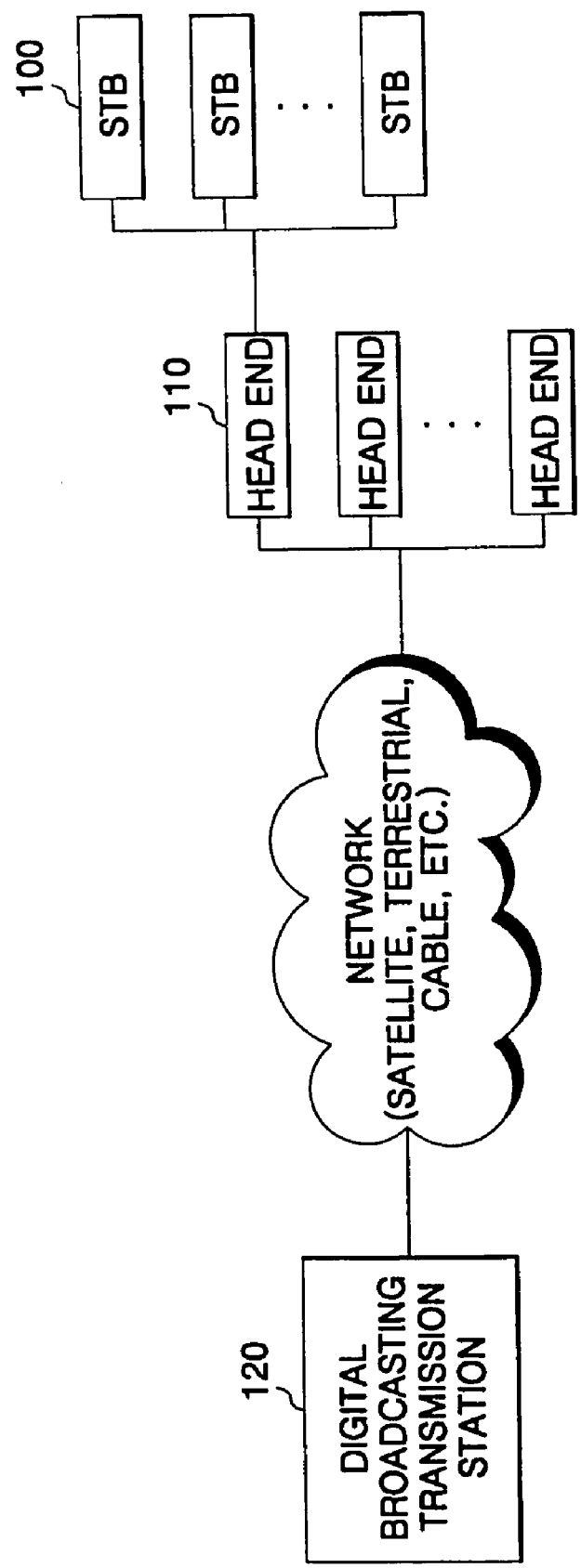
FIG. 1 is a view of a configuration of a digital broadcasting system.

FIG. 1 is a view of a configuration of a digital broadcasting system. As shown in FIG. 1, a digital broadcasting system includes a digital broadcasting transmission station 120, at least one head end 110 connected to the digital broadcasting transmission station 120 through a network, and a Set-Top Box (STB) 100 connected to the head end. The digital broadcasting system can utilize various types of networks, such as a satellite broadcasting network, a terrestrial broadcasting network, a cable broadcasting network, and so on.

The STB 100 can receive software upgrade data when software is damaged and fails to operate properly, or when software is upgraded from an older version, in order to improve broadcasting services. The STB 100 receives the software upgrade data from the digital broadcasting transmission station 120. The digital broadcasting transmission station 120 can transmit the software upgrade data together with a broadcasting signal through the network in order to upgrade the software of the set-top box. The head end 110 makes it possible to transmit the broadcasting signal between the STB 100 and the digital broadcasting transmission station 120 by generating information on the system. Depending on the type of system, the head end 110 can be omitted.

In general, the set-top box 100 upgrades its software through System Information (SI). Specifically, the set-top box 100 receives and analyzes SI to detect a location of downloadable software, tunes into the frequency of the location, and then finds software upgrade data to upgrade its software.

Figure 2:
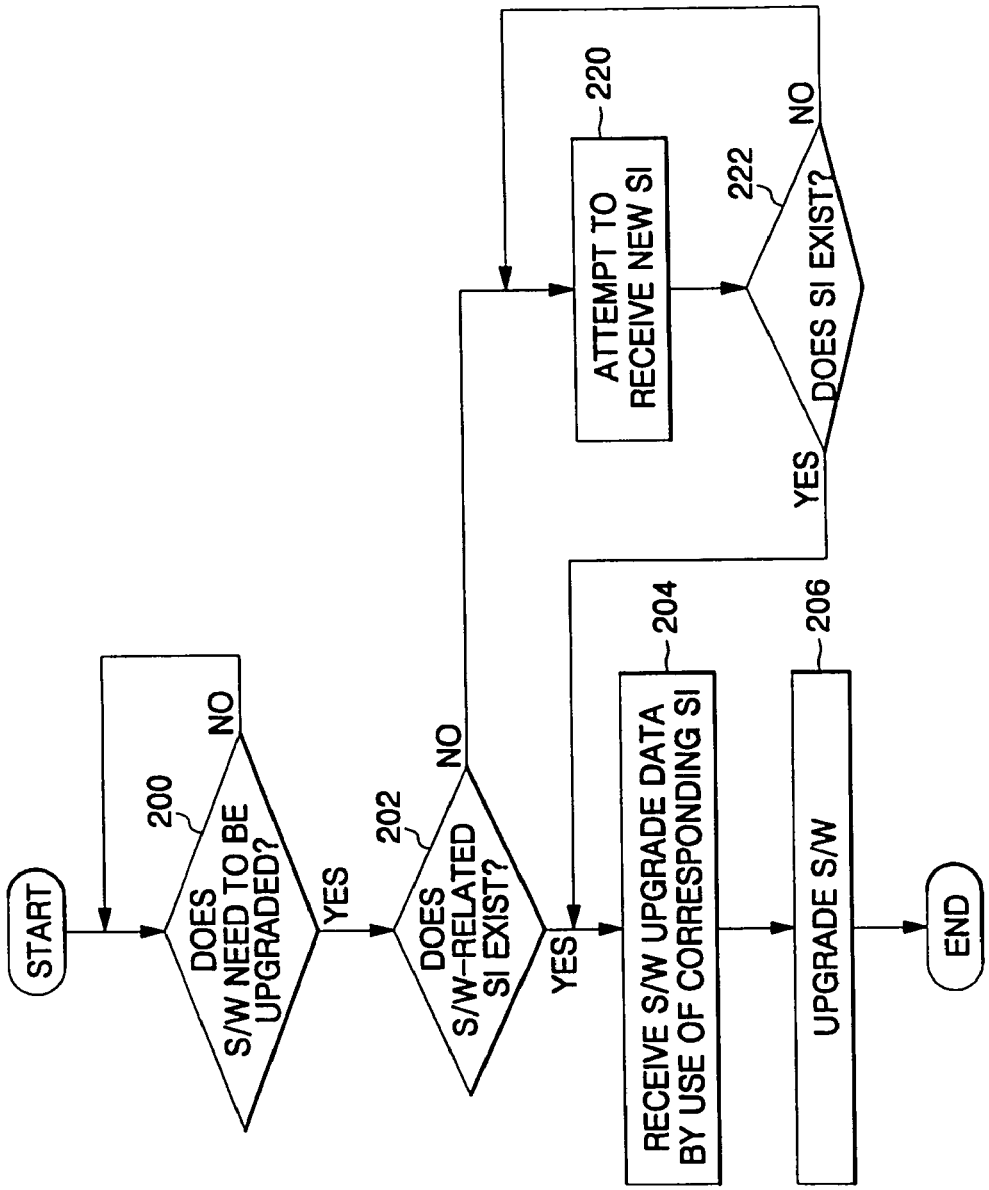
FIG. 2 is a flowchart of a process of upgrading software of an Set-Top Box (STB)

FIG. 2 is a flowchart of a process of upgrading software of an STB. An STB 100 first determines whether or not its software requires upgrading (S200). If it is determined that upgrading is required, the STB 100 determines whether or not there is software-related SI in a received signal (S202). If the result of checking in step S202 indicates that there is no software-related SI, the STB performs a step S220 of attempting to receive new SI, and a step S222 of determining whether the newly received SI is associated with a software upgrade, until software-related SI has been received.

If there is software-related SI in the received signal, the STB 100 receives data for upgrading its software using the corresponding SI (S204), and upgrades its software using the received data (S206).

Hereinafter, the present invention is described in more detail with reference to the accompanying drawings, in which exemplary embodiments of the invention are shown. To enable a clear understanding of the present invention, related technology that is well known to those of ordinary skill in the technical field to which the present invention pertains, has not been described in detail.

The present invention is characterized by upgrading the software of a Set-Top Box (STB) using Program Specific Information (PSI) rather than System Information (SI). PSI is information defined basically in the Motion Picture Experts Group (MPEG) standard.

Before describing the configuration of an apparatus for upgrading the software of an STB according to the present invention, the reason why PSI makes it possible to upgrade software in a malfunctioning STB will first be explained.

FIG. 3 is a view of signals transmitted between a digital broadcasting station and an STB in a digital broadcasting system.

As shown in FIG. 3, a digital broadcasting system has a variety of information such as PSI, Advanced Television Systems Committee (ATSC) information, Digital Video Broadcast (DVB) information, and so on, including audio/video signals. Unlike ATSC information, DVB information, etc., which include SI according to different standards, PSI includes SI as basic information together with an AV channel. Since PSI is defined in the MPEG standard and is needed at least to playback AV data, all broadcasting channels of MPEG-2 have PSI. In other words, unlike SI, PSI is always transmitted in an AV channel whenever AV data is transmitted. Furthermore, PSI does not require a separate configuration for its extraction. Therefore, a software upgrade mode using PSI would enable continuous provision of service after software is upgraded, even when an STB malfunctions.

Generally, information such as PSI, ATSC information, DVB information, etc., used in a digital broadcasting system, is tabulated. A PSI table includes information required for the STB 100 to demultiplex a Transport Stream (TS) received from the digital broadcasting station 120. The PSI table can include a Program Association Table (PAT), a Conditional Access Table (CAT), and a Program Map Table (PMT).

The PSI allows the STB 100 intended to upgrade the software to detect a location of the software upgrade data. Information on the location of the software upgrade data, i.e., program_number, stream_type, and transport_stream_id, can be included in the PSI. Among this information, program_number is used to distinguish each program in frequency, and stream_type is used to determine whether each stream in a program corresponds to audio, video, data, or is user-defined. These two pieces of information are essential for AV playback. The third piece of information, transport_stream_id, is used to distinguish each frequency. The present invention is adapted to detect the location of downloadable software and upgrade software of the STB using PSI, and especially, using transport_stream_id. It is assumed that the program_number, the stream_type, and the transport_stream_id are preset between the digital broadcasting transmission station 120 and the STB 100.

Signals containing the above-mentioned A/V data, PSI, ATSC data, DVB data, etc., are multiplexed by a multiplexer of the digital broadcasting transmission station 120, transmitted to the STB 100 through the network, and then demultiplexed by a demultiplexer. In other words, the STB 100 demultiplexes the received signals in order to obtain necessary information.

An apparatus for upgrading software of an STB using PSI according to an embodiment of the present invention is described as follows.

Figure 4:
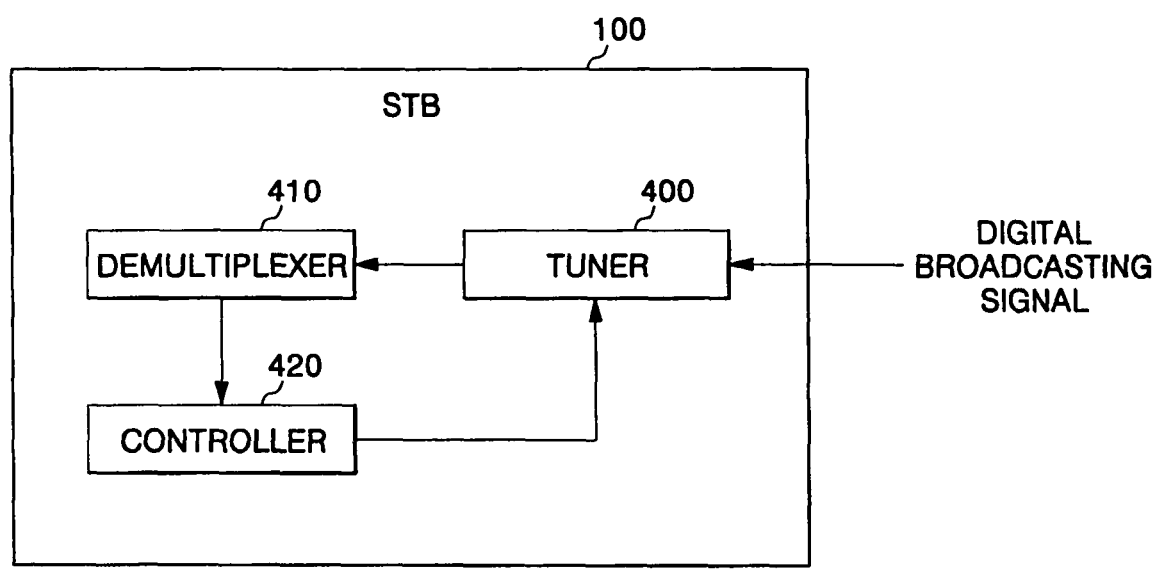
FIG. 4 is a block diagram of an apparatus for upgrading software of an STB in accordance with an embodiment of the present invention.

FIG. 4 is a block diagram of an apparatus for upgrading software of an STB according to an embodiment of the present invention.

As shown in FIG. 4, an apparatus for upgrading software of an STB according to an embodiment of the present invention includes a tuner 400, a demultiplexer 410, and a controller 420. The tuner 400 scans for a frequency of a signal in order to receive signals from a digital broadcasting transmission station 120. A tuned signal is output to the demultiplexer 410. The demultiplexer 410 demultplexes the received signal, splits it into original signals that were multiplexed at the digital broadcasting transmission station 120, and then outputs the split signals to the controller 420.

The controller 420 checks whether there is PSI in the demultiplexed signals received from the demultiplexer 410. If there is PSI in the received signals, the controller 420 receives software upgrade data using the PSI, and then upgrades the software using the received software upgrade data. If there is no PSI in the received signals, the controller 420 instructs the tuner 400 to scan for signals having other frequencies. Furthermore, the controller 420 can comprehensively control a process of upgrading software according to the present invention, for example, a process of determining whether or not the STB 100 needs to upgrade software.

Operation of the apparatus for upgrading software of an STB according to an embodiment of the present invention is described below with reference to the drawings.

Figure 5:
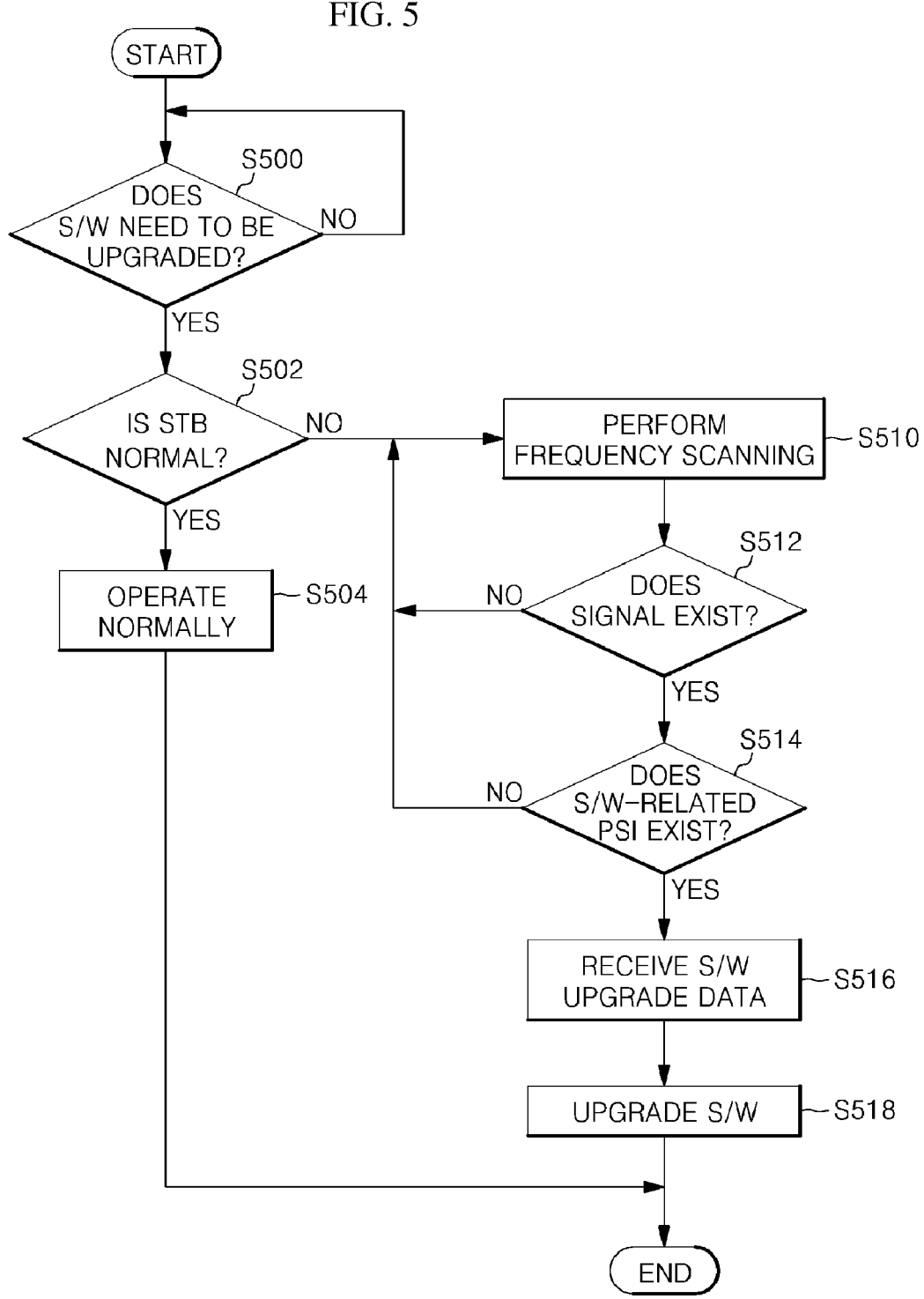
FIG. 5 is a flowchart of a process of upgrading software using an STB employing PSI in accordance with an embodiment of the present invention.

FIG. 5 is a flowchart of a process of upgrading software of an STB employing PSI in accordance with an embodiment of the present invention.

An apparatus of the present invention determines whether or not the STB 100 requires a software upgrade at present (S500). A determination is made that the STB 100 requires a software upgrade when the software of the STB 100 malfunctions or when the software of the STB 100 needs to be replaced with a newer version, etc. In other words, the apparatus of the present invention determines whether or not the STB 100 is malfunctioning, and if it is, determines that the software needs to be upgraded. A determination of whether or not a malfunction exists can utilize an integrity test, such as an error detection method, e.g., a Cyclic Redundancy Check (CRC).

Among all of the various integrity test methods, the CRC is the simplest, most commonly used error detection method capable of checking every byte of software and determining whether any part is damaged. Of course, the STB 100 software upgrade can be performed when existing software is replaced with new software, or when an upgrade is requested by a system operator.

For example, the integrity test, etc. can be performed through a boot loader when the STB 100 is booted. The boot loader is the simplest type of software and operates when a system is started up. The boot loader can be used to initialize the system, detect problems, etc.

If a determination has been made that the software of the STB 100 needs to be upgraded, the apparatus of the present invention determines whether the STB 100 can operate normally to receive SI (S502). If a determination has been made that the STB 100 can operate normally, the STB 100 operates normally (S504). Normal operation refers to detecting the location of the software upgrade data using the SI, and then receiving the data from the detected location to upgrade the software.

If a determination has been made in step S502 that the STB 100 cannot operate normally, the software upgrading apparatus of the present invention performs the processes from step S510 to step S518 to upgrade the STB 100 using the PSI. The processes from step S510 to step S518 are described in detail as follows.

In step S510, frequency scanning for signal reception is carried out. This frequency scanning continues until a channel having a signal is detected in step S512.

If a channel having a signal has been detected, a determination is made as to whether there is software related PSI in the signal received through the channel. This is checked because PSI is not received through all channels. To be specific, information used in the present invention is program_number, stream_type, and transport_stream_id. Therefore, it can be said that steps S510 to S514 are processes for checking whether the program_number, stream_type, and transport_stream_id are present. The detailed description of these processes is as follows. The apparatus of the present invention scans a range of predetermined frequencies, and if there is a signal in the corresponding frequency range, attempts reception of a Program Association Table (PAT). If a PAT having the desired transport_stream_id has been received, a determination is made as to whether the PAT contains the desired program_number. If so, an attempt is made to obtain a PID (Program IDendifier) corresponding to the program_number, and then to receive the PMT corresponding to the PID again. If the PMT has not been received, the apparatus proceeds to the next frequency. However, if the PMT has been received, the stream_type is examined to determine if it is a software download type. If so, the apparatus receives the PID corresponding to the stream from the PMT, and attempts to receive the software. If the software has not been received, the apparatus proceeds to the next frequency. This process is performed for all frequencies until the program_number information, the stream_type information, and the transport_stream_id information are received.

In step S516, the apparatus of the present invention detects a location of software upgrade data using the PSI obtained through the above-mentioned processes, and then receives the software upgrade data from the location. In step S518, the apparatus of the present invention upgrades the software using the received software upgrade data.

As set forth above, the present invention upgrades the software of the STB using the PSI defined in MPEG-2, thereby being capable of upgrading software even when the STB malfunctions due to damaged software, and consequently enabling recovery from the malfunction.

Of course, since upgrading software using the SI and upgrading software using the PSI both have their advantages and drawbacks, it is preferable to use both methods. For example, when the STB operates normally, the software is upgraded using the SI. When the STB does not operate normally, the software is upgraded using the PSI. However, this is simply suggested as one exemplary embodiment of the present invention and does not restrict the present invention.

The present invention is adapted to upgrade the software of the STB using the PSI, thereby being capable of upgrading the software even when the STB malfunctions due to damaged software, and consequently enabling recovery from the malfunction. Furthermore, the present invention makes use of the PSI defined in the MPEG-2 standard, so that it can be applied universally to all STBs regardless of their different standards.

Although exemplary embodiments of the present invention have been described, it will be understood by those skilled in the art that the present invention is not limited to the described exemplary embodiments. Various changes and modifications can be made within the spirit and scope of the present invention as defined by the following claims.

What is claimed is:

1. An apparatus to upgrade software of a Set-Top Box (STB), the apparatus comprising:
   a receiver to receive a digital broadcasting signal and to only extract System Information (SI) in a first mode and only Program Specific Information (PSI) in a second mode from the received digital broadcasting signal; and
   a controller, in the first mode, to receive the SI from the receiver and to receive the software upgrade data using the received SI, and, in the second mode, to receive the PSI from the receiver and to receive software upgrade data using the received PSI to upgrade the software,
   wherein the controller is configured to receive the software upgrade data in the first mode using the SI when the software needs to be upgraded, and to receive the software upgrade data through the PSI in the second mode if the software cannot be updated in the first mode using the SI.

2. The apparatus of claim 1, wherein, in the second mode, the controller is configured to detect a location of the software upgrade data using the PSI and to receive the software upgrade data from the detected location.

3. The apparatus of claim 2, wherein, in the second mode, the controller is configured to detect the location of the software upgrade data using program_number, stream_type, and transport_stream_id information provided in the PSI.

4. The apparatus of claim 1, wherein the receiver comprises:
   a tuner to scan for a frequency of the digital broadcasting signal to receive the signal; and
   a demultiplexer to receive a multiplexed signal from a channel of the frequency scanned by the tuner, to demultiplex the received signal, and to split the demultiplexed signal into original signals.

5. The apparatus of claim 4, wherein, in the second mode, the controller is configured to control the tuner to scan for a channel of another frequency if the PSI received through the demultiplexer is not the PSI providing the software upgrade data.

6. The apparatus of claim 1, wherein the controller is configured to determine whether the software upgrade data has been received through the SI in the first mode by performing a Cyclic Redundancy Check (CRC).

7. A method of upgrading software of a Set-Top Box (STB), the method comprising:
   detecting, by the STB, whether or not a request to upgrade the software has been made;
   extracting, in a first mode, only System Information (SI) and, in a second mode, only Program Specific Information (PSI) from received information;
   receiving software upgrade data using the SI in the first mode and the PSI in the second mode; and
   upgrading the software using the received software upgrade data,
   wherein the STB detecting the request to upgrade the software determines whether or not the software upgrade data is receivable through the SI in the first mode, and receives the software upgrade data through the PSI in the second mode if the software upgrade data is not receivable through the SI in the first mode.

8. The method of claim 7, wherein the determination of whether or not the software upgrade data is receivable through the SI in the first mode comprises performing a Cyclic Redundancy Check (CRC).

9. The method of claim 7, wherein, in the second mode, receiving the software upgrade data comprises:
   checking for a location of the software upgrade data using the PSI; and receiving the software upgrade data from the location of the software upgrade data.

10. The method of claim 9, wherein, in the second mode, checking for the location of the software upgrade data is effected using program_number, stream_type and transport_stream_id information provided in the PSI.

11. The method of claim 7, wherein detecting that a request to upgrade the software has been made comprises detecting that an error has been generated as a result of performing a Cyclic Redundancy Check (CRC).

* * * * *